(12) United States Patent
Wu et al.

(10) Patent No.: US 12,190,305 B2
(45) Date of Patent: Jan. 7, 2025

(54) SYSTEMS AND METHODS FOR ACCOUNTS WITH MULTIPLE PROFILES

(71) Applicant: Capital One Services, LLC, McLean, VA (US)

(72) Inventors: Wendy Wu, Falls Church, VA (US); Kevin Osborn, Newton Highlands, MA (US); Andrew M. Marr, Midlothian, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 77 days.

(21) Appl. No.: 17/851,514

(22) Filed: Jun. 28, 2022

(65) Prior Publication Data
US 2023/0419292 A1    Dec. 28, 2023

(51) Int. Cl.
*G06Q 20/22* (2012.01)
*G06Q 20/34* (2012.01)
(Continued)

(52) U.S. Cl.
CPC ......... *G06Q 20/227* (2013.01); *G06Q 20/351* (2013.01); *G06Q 20/3676* (2013.01); *G06Q 20/407* (2013.01)

(58) Field of Classification Search
CPC ............. G06Q 20/227; G06Q 20/351; G06Q 20/3676; G06Q 20/407
(Continued)

(56) References Cited

U.S. PATENT DOCUMENTS

| 5,953,710 A * | 9/1999 | Fleming | G06Q 20/405 |
| | | | 235/380 |
| 6,732,919 B2 | 5/2004 | Macklin et al. | |

(Continued)

FOREIGN PATENT DOCUMENTS

| CN | 101884051 A * | 11/2010 | ............. G06Q 20/04 |
| DE | 102021205259 A1 * | 12/2021 | ......... G06F 16/2282 |

(Continued)

OTHER PUBLICATIONS

Website: https://fuzecard.com/products/fuzecard; Accessed Dec. 31, 2021.
(Continued)

*Primary Examiner* — Sara C Hamilton
(74) *Attorney, Agent, or Firm* — TROUTMAN PEPPER HAMILTON SANDERS LLP; Christopher J. Forstner; Matthew J. Esserman

(57) ABSTRACT

Disclosed embodiments may include a method for using accounts with multiple profiles where the system allows a primary user to create one or more secondary user profiles. Each secondary user profile is associated with its own VCN and one or more attributes. The one or more attributes can be used to limit the spending ability of each secondary user individually with hard and soft spending limits including merchant category, overall spending, and geographic limits. Purchases by a secondary user that violate the soft limits may be allowed by the primary user using an application associated with the primary account number. Attributes can be assembled by the primary user to create specific and creative spending limits. The system associates each transaction with the user profile using the specific VCN and generates a GUI for the primary user showing the second user profile, its current balance, and transaction history.

20 Claims, 5 Drawing Sheets

(51) Int. Cl.
   *G06Q 20/36* (2012.01)
   *G06Q 20/40* (2012.01)
(58) Field of Classification Search
   USPC .......................................................... 705/39
   See application file for complete search history.

(56) References Cited

U.S. PATENT DOCUMENTS

| | | | |
|---|---|---|---|
| 7,249,092 B2 | 7/2007 | Dunn et al. | |
| 8,127,982 B1* | 3/2012 | Casey | G06Q 40/02 |
| | | | 235/382.5 |
| 8,308,059 B2 | 11/2012 | Granucci et al. | |
| 8,622,308 B1* | 1/2014 | Field | G06Q 20/227 |
| | | | 235/487 |
| 8,622,309 B1 | 1/2014 | Mullen et al. | |
| 9,213,976 B2 | 12/2015 | Carmichael et al. | |
| 9,224,141 B1* | 12/2015 | Lamba | G06Q 20/341 |
| 9,691,058 B2* | 6/2017 | Epler | G06Q 20/10 |
| 9,727,813 B2 | 8/2017 | Mullen et al. | |
| 10,032,101 B2 | 7/2018 | Bae et al. | |
| 10,332,102 B2 | 6/2019 | Zarakas et al. | |
| 10,445,739 B1* | 10/2019 | Sahni | G06Q 20/405 |
| 2003/0197058 A1* | 10/2003 | Benkert | G06Q 20/227 |
| | | | 235/380 |
| 2004/0039694 A1* | 2/2004 | Dunn | G06Q 40/02 |
| | | | 705/39 |
| 2007/0040015 A1* | 2/2007 | Carlson | G06Q 40/00 |
| | | | 235/379 |
| 2007/0138299 A1 | 6/2007 | Mitra | |
| 2008/0228637 A1* | 9/2008 | Scipioni | G06Q 40/02 |
| | | | 705/35 |
| 2008/0228638 A1* | 9/2008 | Scipioni | G06Q 20/10 |
| | | | 705/39 |
| 2009/0037326 A1* | 2/2009 | Chitti | G06Q 20/10 |
| | | | 715/812 |
| 2012/0030109 A1* | 2/2012 | Dooley Maley | G06Q 20/2295 |
| | | | 705/44 |
| 2012/0330837 A1* | 12/2012 | Persaud | G06Q 20/20 |
| | | | 705/44 |
| 2013/0018792 A1 | 1/2013 | Casey et al. | |
| 2013/0085938 A1* | 4/2013 | Stone | G06Q 20/3572 |
| | | | 705/41 |
| 2013/0103560 A1* | 4/2013 | Stone | G06Q 20/351 |
| | | | 705/35 |
| 2015/0186886 A1 | 7/2015 | Schwalb et al. | |
| 2016/0260097 A1* | 9/2016 | Nadella | G06Q 20/36 |
| 2017/0046665 A1 | 2/2017 | Sheehan et al. | |
| 2017/0186008 A1* | 6/2017 | Pachouri | H04L 63/18 |
| 2017/0221058 A1* | 8/2017 | Choudhary | G06Q 20/3255 |
| 2017/0262841 A1* | 9/2017 | Good | G06Q 20/385 |
| 2017/0270521 A1* | 9/2017 | Good | H04L 51/046 |
| 2017/0300894 A1* | 10/2017 | Shanmugam | G06Q 20/24 |
| 2017/0300895 A1* | 10/2017 | Shanmugam | G06Q 20/385 |
| 2017/0300906 A1* | 10/2017 | Shanmugam | G06Q 20/405 |
| 2017/0300907 A1* | 10/2017 | Shanmugam | G06Q 20/3255 |
| 2017/0316405 A1* | 11/2017 | Lonni | G06Q 20/3674 |
| 2018/0225666 A1* | 8/2018 | Khan | G06Q 20/405 |
| 2018/0225698 A1 | 8/2018 | Sprogoe et al. | |
| 2019/0080309 A1* | 3/2019 | Goodwin | G06Q 20/401 |
| 2020/0005317 A1 | 1/2020 | Amor et al. | |
| 2020/0058012 A1* | 2/2020 | Chandorkar | G06Q 20/227 |
| 2020/0090148 A1* | 3/2020 | Lawrence | G06Q 20/229 |
| 2021/0004801 A1 | 1/2021 | Barnum et al. | |
| 2021/0357889 A1* | 11/2021 | Lawrence | G06Q 20/0655 |
| 2021/0374709 A1* | 12/2021 | Suresh | G06F 16/2282 |
| 2022/0366411 A1* | 11/2022 | Bajwa | G06Q 20/229 |
| 2023/0107711 A1* | 4/2023 | Crews, Jr. | G06Q 20/401 |
| | | | 705/39 |

FOREIGN PATENT DOCUMENTS

| | | | | |
|---|---|---|---|---|
| WO | 2016175897 A1 | 11/2016 | | |
| WO | WO-2017023757 A1 * | 2/2017 | ............. | G06Q 20/20 |
| WO | WO-2018048546 A1 * | 3/2018 | ........... | G06Q 20/102 |
| WO | WO-2021137973 A1 * | 7/2021 | ............. | G06F 21/31 |

OTHER PUBLICATIONS

Website: https://stripe.com/issuing; accessed Dec. 31, 2021.
International Search Report and Written Opinion in related PCT Application No. PCT/US2023/069207 mailed Oct. 13, 2023.

* cited by examiner

SYSTEMS AND METHODS FOR ACCOUNTS WITH MULTIPLE PROFILES

The disclosed technology relates to systems and methods for accounts with multiple profiles. Specifically, this disclosed technology relates to a system that allows for multiple users with different profiles to use the same financial card in different ways according to profile attributes.

BACKGROUND

Financial cards have long been a staple of retail commerce. Financial cards can include a number of different cards including debit cards or credit cards. Users frequently have one or more financial cards that they use to make purchases. In many cases, families share credit cards with each parent having a card related to the same account. Children and teenagers are often given credit cards for emergencies or for regulated spending such as to purchase gasoline for a car.

SUMMARY

Disclosed embodiments may include a system for accounts with multiple profiles. The system may include one or more processors, and memory in communication with the one or more processors and storing instructions that, when executed by the one or more processors, are configured to cause the system to create or use accounts with multiple profiles. The system may include configuring the card with a primary account number such that a primary user can control one or more profiles of one or more secondary users associated with one or more virtual card numbers (VCNs). The system may also include receiving, from a primary user device, first directions to create a second user profile for a second user. Additionally, the system may include generating the second user profile, the second user profile associated with a second user virtual card number and a second user virtual card number (VCN) token. Furthermore, the system may include generate a first graphical user interface (GUI) reflecting an initial balance associated with the second user profile. The system may also include sending the first GUI and a first prompt for one or more attributes for the second user profile for display on the primary user device. The system may include receive, from the primary user device, the one or more attributes for the second user profile. The system may also include receive, from a merchant, first transaction information corresponding to a first transaction, wherein the first transaction information comprises the second user virtual card number. Additionally, the system may include determine whether the first transaction is allowed according to the attributes assigned to the second user profile. The system may, in response to determining that the first transaction is allowed according to the attributes assigned to the second user profile, charge or debit an amount of the first transaction to the primary account number, associate the first transaction information with the second user profile based on the first transaction information comprising the second user virtual card number, generate a second GUI reflecting an updated balance associated with the second user profile and the first transaction information, and send the second GUI to display on the primary user device.

Disclosed embodiments may include a system for accounts with multiple profiles. The system may include one or more processors, and memory in communication with the one or more processors and storing instructions that, when executed by the one or more processors, are configured to cause the system to create or use accounts with multiple profiles. The system may include receiving, from a merchant, first transaction information corresponding to a first transaction, wherein the first transaction information comprises a second user virtual card number for a second user. The system may also include determining whether the first transaction is allowed according to one or more second profile attributes assigned to a second user profile. Additionally, the system may, in response to determining that the first transaction is allowed according to the second profile attributes assigned to the second user profile, charge or debit an amount of the first transaction to a primary account number.

Disclosed embodiments may include a system for accounts with multiple profiles. The system may include one or more processors, and memory in communication with the one or more processors and storing instructions that, when executed by the one or more processors, are configured to cause the system to create or use accounts with multiple profiles. The system may include configuring the card with a primary account number such that a primary user can control one or more profiles of one or more secondary users associated with one or more virtual card numbers. The system may also include receive, from a primary user device, first directions to create a second user profile for a second user. Additionally, the system may include generating the second user profile, the second user profile associated with a second user virtual card number and a second user virtual card number token. Furthermore, the system may include receiving, from the primary user device, one or more attributes for the second user profile. The system may include receiving, from a merchant, first transaction information corresponding to a first transaction, wherein the first transaction information comprises the second user virtual card number. The system may also include determining whether the first transaction is allowed according to the attributes assigned to the second user profile. Finally, the system may, in response to determining that the first transaction is allowed according to the attributes assigned to the second user profile, charge or debit an amount of the first transaction to the primary account number.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1A:
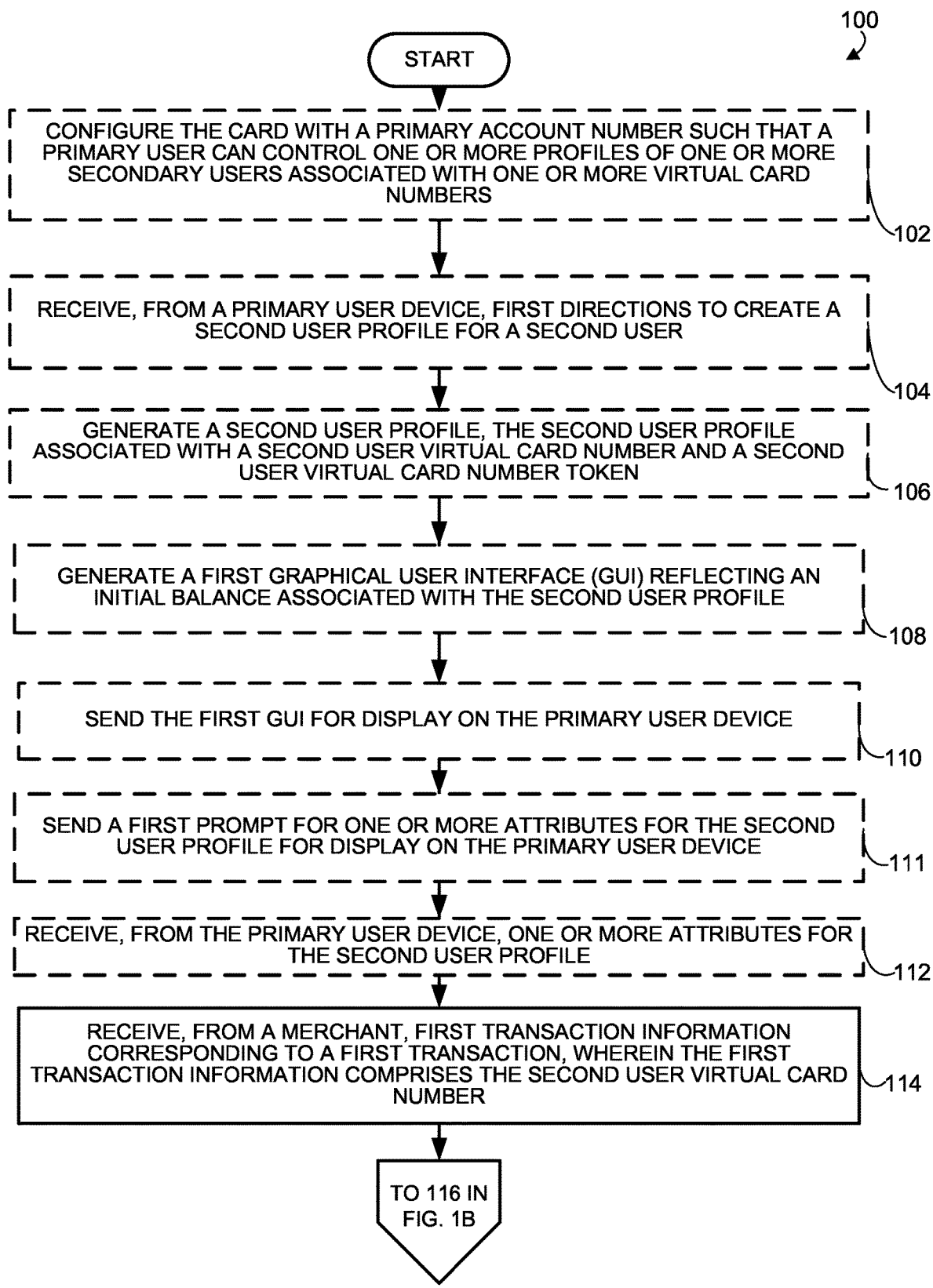
FIG. 1A is a flow diagram illustrating an exemplary method for accounts with multiple profiles in accordance with certain embodiments of the disclosed technology.

In the example noted above, children may be given a parent's credit card. However, children's purchases may not be separately noted as being made by children and the card may not have any specific restrictions surrounding what can be purchased online or in person. Accordingly, there is a need for improved systems and methods for accounts with multiple profiles. Embodiments of the present disclosure are directed to this and other considerations.

Examples of the present disclosure are related to systems and methods for accounts with multiple profiles. More particularly, the disclosed technology relates to a financial card with multiple user profiles that have alterable attributes and can be changed using an application connected with the financial card. The systems and methods described herein utilize, in some instances, graphical user interfaces, which are necessarily rooted in computers and technology. Graphical user interfaces are a computer technology that allows for user interaction with computers through touch, pointing devices, or other means. The present disclosure details a system that allows the primary user to change the attributes of the other profiles using the application associated with the financial card. This, in some examples, may involve using user inputs on a mobile or web application to dynamically change the GUI so that the system responds with selections the user has chosen, which, in turn, changes the ways that a secondary user can use the financial card. Using a GUI in this way may allow the system to assign secondary users unique attributes for using the same financial card.

The disclosed technology may provide an advantage and improvement over prior technologies that only provide financial cards with assorted VCNs because this system allows the primary user significantly more aspects of control and security over the financial card, specifically the ability to limit the card according to certain attributes when the card is being used by secondary users. The present disclosure may solve the issues with prior technologies by allowing secondary users to have individual and unique profiles, each attached to a specific VCN. The primary user may be able to manipulate each profile individually using the GUI of the application associated with the financial card. Furthermore, examples of the present disclosure may also improve the ways that VCNs are processed. The user profile system 320 may work with a plethora of different secondary users with a plethora of different usage cases (e.g., parent/child, boss/employee, individual categorical budgeting). Overall, the systems and methods disclosed have significant practical applications in the financial services industry because of the noteworthy improvements of the profile-specific VCNs, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1B:
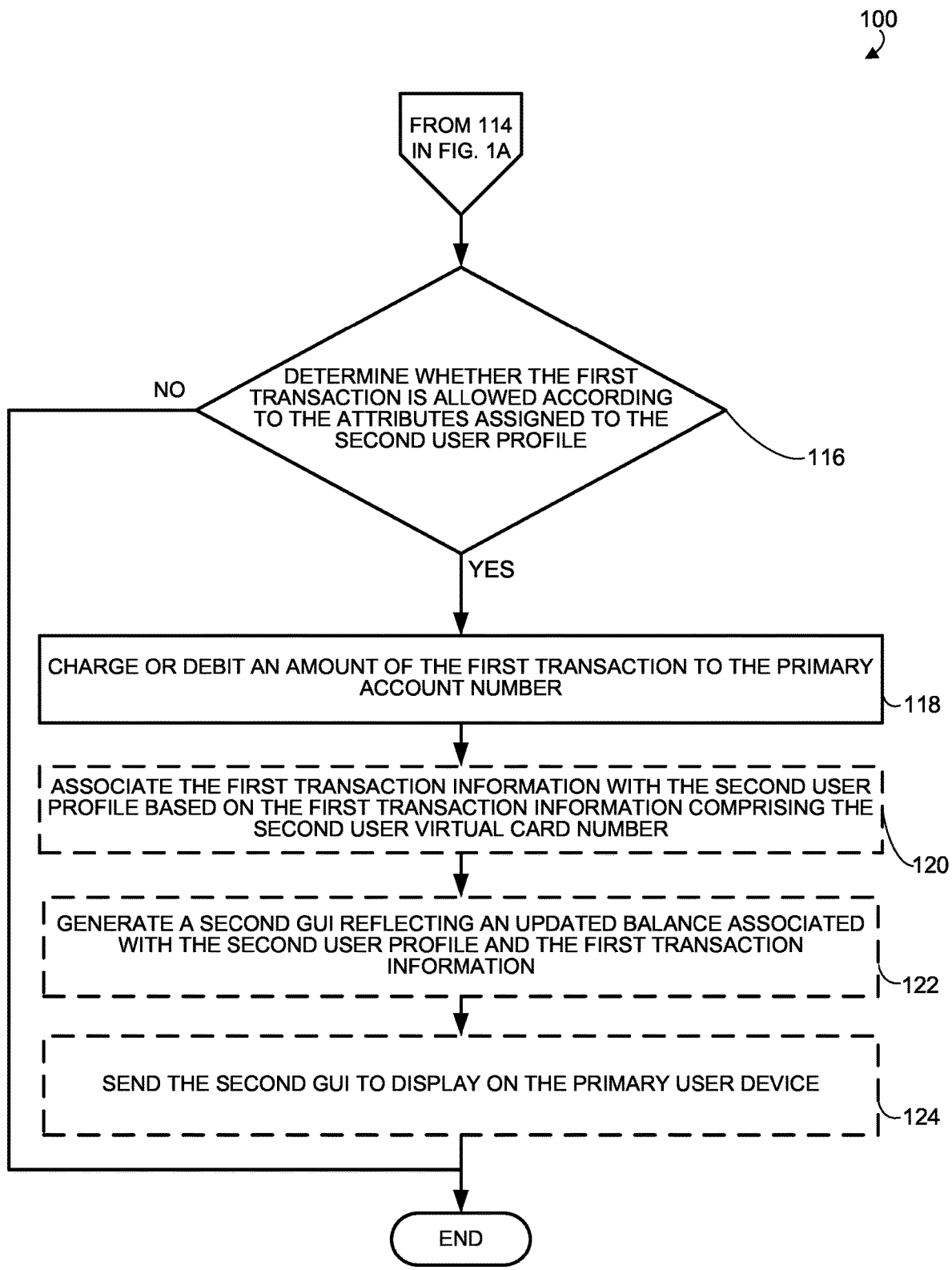
FIG. 1B is a flow diagram illustrating an exemplary method for accounts with multiple profiles in accordance with certain embodiments of the disclosed technology.

FIGS. 1A and 1B are a flow diagram illustrating an exemplary method 100 for accounts with multiple profiles, in accordance with certain embodiments of the disclosed technology. The steps of method 100 may be performed by one or more components of the system 400 (e.g., user profile system 320 or web server 410 of processing system 408 or user device 402), as described in more detail with respect to FIGS. 3 and 4.

In optional block 102, the user profile system 320 may be associated with a financial card (e.g., a credit card or debit card) with a primary account number (PAN) and primary user. The primary user may be associated with a primary profile. The user profile system 320 may, utilizing the primary profile, enable the user to have the ability to control secondary profiles of secondary users (e.g., the user's child). The user profile system 320 may use the secondary profiles for budgeting (e.g., one secondary profile for grocery purchases, another secondary profile for gasoline purchases). The user profile system 320 may associate the secondary profiles with one or more VCNs. The user profile system 320 may configure the primary profile to have superuser capabilities such that the primary user, e.g., via user device 402, may be able to create and delete secondary profiles and their associated VCNs. The PAN may be the primary number involved in charging or debiting transactions to the financial card. The associated VCNs may be associated such that transactions with the associated VCNs are charged or debited to the account associated with the PAN. The PAN may be associated with a token related to the primary number of the financial card. The user profile system 320 including the primary profile and secondary profiles may be stored on a server, or in database 416 and then modified using the primary user device 402.

In optional block 104, the user profile system 320 may receive directions to create a second user profile for a second user. The directions may be received by the user profile system 320 from a primary user device 402. The primary user device 402 may be a computer running an application or a smartphone running a mobile application. The primary user device application may be associated with the financial card, the financial card account, and/or the PAN. The directions may also contain attributes selected by the primary user as described in block 112 below. The directions may also contain preset attributes.

In optional block 106, the user profile system 320 may generate a second user profile to the standards directed by inputs received at the primary user device 402. The second user profile may be associated with a second user VCN and a second user VCN token. The second user VCN token may be for use in the second user's mobile wallet. The system may send the VCN and VCN token associated with the second user to the primary user (e.g., to the primary user's smartphone application) for the primary user to distribute to the second user. Alternatively, the system may send the VCN and VCN token associated with the second user directly to an application associated with the second user's profile (e.g., on a second user device 404). The system may send this information after the generation is complete at this block or with the generated GUI of block 110.

In optional block 108, the user profile system 320 may generate a GUI reflecting the initial balance associated with the second user profile. The initial balance may be zero. If the second user profile was previously canceled, the initial balance may be a prior balance from the previous activation. The GUI may contain budgeting "buckets" or other different organizational schemes. The GUI may present a subledger of transactions associated with the second user profile.

In optional block 110, the user profile system 320 may send the GUI containing the initial balance of the second user profile to the primary user's mobile device 402. The application on the primary user device 402 may allow the primary user to assign transactions from the primary account number to the second user profile balance. The initial balance of the second user profile may increase when transactions are made using the VCN connected to the second user profile. The balance may decrease when credits are made using the VCN connected to the second user profile.

In optional block 111, the user profile system 320 may send a first prompt to be displayed on the primary user device 402 asking the primary user to provide or select one or more attributes for the second user profile. The prompt may include a drop-down menu and buttons for the primary user to select the attributes. The prompt may include a button to allow the primary user to add an additional attribute. The prompt may include a button to allow the primary user to create complex limitations containing one or more attributes. The prompt may also include one or more attribute presets that are setup for a particular type of secondary user (e.g., child, teenager, elderly parent, friend). The prompt may allow the primary user to design their own attribute using the primary user device 402. This block may be optional if the prompt for attributes is generated by the user device application.

In optional block 112, the user profile system 320 may receive one or more attributes for the second user's profile from the primary user device. Once the secondary user profiles are generated, the primary user may have full control of the attributes of each secondary user. The user profile system may receive input from the primary user allowing the primarily user to be able to turn the attributes of the profile on and off at will and with immediate effect. The primary user may also be able to provide input to the system that directs the system to suspend the account of the second user at will. The primary user may instruct the system to assign different attributes to different profiles. The primary user may instruct the system to be able to copy one profile or set of attributes from a second user to a different user at one time. The primary user may be able to instruct the system to add or assign a superuser role to an additional user (e.g., one parent allows the other parent to also have control of assigning attributes to their teenager's credit card). Attributes may also include names that the primary user can assign to each profile.

Attributes may include a variety of limitations for the second user profile such as: spending limits (e.g., setting the credit limit equal to $200), merchant category limits (e.g., allowed at gas stations, but not theme parks), specific merchants (e.g., allowed at Walmart®, but not Target®), merchants with only certain category codes, geographic limits (e.g., allowed at merchants within 25 miles of home, within 50 miles of Richmond, VA, or within 25 miles of the primary account user location), and time limits (e.g., allowed from 7 AM to 8 PM). The attributes may allow the primary user to personalize the card for the secondary user. Such attributes may be mixed and matched by the primary account user with the GUI of their primary user device using the application associated with the financial card (for example, for a teenager, a parent may make purchases of gas allowed at all times with no limit, purchases at bars never allowed, and purchases at the movies only allowed between 3-9 PM on weekends with a maximum spend limit of $25). Attributes may include a combination of different spending limitations. The primary user may be able to set a certain priority order of attributes.

Attributes may also include hard or soft limits. Hard limits may prevent the second user from completing a transaction because of a limitation. Attempts by the second user to break the hard limit may cause an optional notification to appear on the user device (402) of the primary user (e.g., If the second user is blocked from making transactions at restaurants and attempts to charge the card at a restaurant, then the transaction would be declined and detected by the user profile system 320, and a notification would be sent to the primary user device 402 that the second user attempted to make a transaction at a restaurant. This may include details of which restaurant). Soft limits may allow the primary user to give permission for the second user to complete a transaction even though it would otherwise break a limitation rule (e.g., an attribute) by sending a signal from the primary user device 402 to the user profile system 320. For example, when a second user is blocked from making transactions from gas stations after 10 PM and attempts to charge the card at a gas station, the transaction would be declined and detected by the user profile system 320. The primary user would be notified via the primary user device 402 that a transaction was attempted at a particular gas station. However, in this case, the notification on the primary user device 402 may additionally include a prompt for the primary user to respond to the transaction. The primary user may allow the transaction for the second user by interacting with the primary user device 402. The primary user device 402 would send a signal back to user profile system 320 to allow the transaction (in which case, the second user would simply have to attempt the transaction again within a predetermined time period) and the transaction would be accepted. The primary user may reject the transaction using the primary user device 402, which send a signal back to user profile system 320 to prevent the transaction and would turn the soft limit temporarily into a hard limit for a predetermined time. If the primary user does not respond via primary user device 402 in a predetermined time period, it may be considered a rejection by user profile system 320 after a predetermined amount of time. The notification may come from the application associated with the financial card or the notification may be a chat or text message (e.g., "respond YES to allow"). Limits may also be against a certain type of merchant or method of delivery (e.g., online or digital purchases are prohibited).

Additionally, the secondary user may also receive a notification from user profile system 320 on the application associated with their user profile on a second user device 404 when completing a transaction that would be outside the limitations assigned by the attribute. This notification on second user device 404 may include a prompt allowing the second user device to send a notification to the primary user device 402 for permission to make a transaction if the attribute limitation preventing the transaction is a soft limit.

Certain attributes may also be eligible for emergency limits. For example, a child may need to purchase something outside typical limits for emergency reasons (e.g., gas to get home). The secondary user application on second user device 404 may have a method (e.g., a menu or button) by which the secondary user, in very limited circumstances, as selected by the primary user (e.g., during profile setup), may be able temporarily override certain selected hard and soft limits. Such limits may apply only in emergencies where the primary user (via the primary user device 402) is unreachable or in circumstances that the primary user selects (e.g., the primary user device 402 distance is greater than 50 miles away from the second user device 404). The secondary user may have to make a selection on their secondary user application on the second user device 404 before attempting to use the card for the transaction to be charged or debited. Emergency limits may be subject to time and frequency constraints (e.g., the secondary user can only make a purchase that would fall under emergency limits once per month).

In block 114, the user profile system 320 may receive first transaction information that relates to a first transaction made by the second user. The first transaction information may be received from a merchant. The first transaction information may include the second user virtual card number or the second user virtual card number token. The transaction information may include the name of the merchant, the name of the second user, the address of the second user, the amount of transaction, the merchant category, geographical information regarding the merchant (e.g., a specific store or general location within a certain area), and item information. Block 114 may include the merchant acquirer sending the card number to the network, the network processing the card number to determine the issuer, the network sending the card number to the issuer, and the issuer determining that the card number is a VCN.

In block 116, the user profile system 320 may determine if the transaction is allowed according to the attributes assigned to the user profile. The user profile system 320 will analyze the transaction data using information provided by the merchant. If the transaction data is within the attributes assigned to that user profile (e.g., user profile 3 is attempting to make a $300 charge when the limit is $500), then the transaction will be allowed. If the transaction data is not within the attributes assigned to that use profile (e.g., user profile 3 is attempting to make a $600 charge when the limit is $500), then the transaction will not be allowed. This may include the issuer determining if the transaction on the VCN is within the profile limits set by the attributes. If the transaction is within the limits, then the transaction may be sent to the payment processor using the PAN.

Additionally, the user profile system 320 may receive more than one transaction, associated with more than one secondary user account, with each user account with different attributes and different VCNs. The user profile system 320 may use the transaction information to determine which user profile to attribute the charge to. For example, in an office setting, a manager may be the primary user with a secretary as the second user. The secretary's profile may contain attributes only allowing the secretary to purchase office supplies under $200. The third user may be a janitor who is allowed to purchase building materials up to $500. The fourth user may be a salesman who is allowed to purchase meals at restaurants up to $300.

In block 118, the user profile system 320 may charge or debit the account associated with the PAN the amount of the transaction. The issuer may send the PAN to the payment processor to allow payment. The issuer may also be a VCN provider. The issuer may charge the transaction to the PAN if the transaction information includes the second user's name and address as assigned on the second user profile. The second user's name and address may be allowed by the issuer even if the second user's name and address is different from that of the primary user. The transaction may be placed on the main account ledger associated with the primary account.

In optional block 120, the user profile system 320 may associate the transaction information with the second user profile using the VCN. Block 120 may occur before or at the same time as block 118. The VCN number may be used to associate the transaction with the second user profile. Other transaction information, such as the name and address used with the transaction may be used to coordinate the transaction to the secondary user. The user profile system 320 may create a subledger for the second user profile that contains just the transactions associated with the second user profile.

In optional block 122, the user profile system 320 may generate a GUI with an updated account balance for the second user profile using the transaction information. The GUI may show new transactions as pending. The user profile system 320 may also generate an additional GUI for additional user profiles. The GUI may contain transaction information regarding the most recent transactions and prior transactions. The GUI may contain the merchant information, the amount of the transaction, and if the transaction was within the soft limits, among other data. The transaction data may be able to be sorted or organized by a variety of means. The GUI may present the subledger for the second user profile.

In optional block 124, the user profile system 320 may send the GUI to display on the primary user device. The primary user may then view the updated balance for the second user profile. The primary user may be able to interact with the newly posted transaction through the primary user device 402. The primary user may be able to sort transactions associated with the second user account based on attributes assigned by the primary user and display those on the primary user device 402 by interacting with the GUI on the primary user device 402. The primary user may also see the transaction reflected on the primary user's account balance on the primary user device 402. The transaction may be highlighted in a color coordinated with that of the secondary user (e.g., all of the second user's account transactions are highlighted in blue; all of the third user's account transactions are highlighted in orange). The primary user may be able to move transactions between users (for example, if the parent made a transaction with their primary credit card number for a child and the parent wanted that number to be reflected on the child's user profile balance). The second user profile balance may also show a history of declined charges that were attempted by the second user. The subledger of the second user profile may be displayed on the primary user device as part of the GUI. The main account ledger associated with the primary account may be displayed as part of the GUI.

The GUI may also be sent to the second user's device 404 by user profile system 320. The second user may have an application and an account for manipulating and interacting with the second user profile. The second user profile account and application may have a similar GUI to the primary user application. The second user profile account and application may have limited features compared to the primary user application. The second user profile application may allow the second user to interact with posted transactions such as through organization or sorting of transactions. Each user profile may have an associated GUI sent to an associated application on an associated device. The subledger of the second user profile may be displayed on the second user's device as part of the GUI.

Additionally, the primary user may send directions to user profile system 320 to update or change the user profile attributes for one or more secondary users after the secondary users have made a transaction. This would be similar to block 112. After receiving the changed user profile attributes, the user profile system 320 may update the associated profile with the changed attributes. Future transactions attempted by the secondary user with the profile with the changed attributes will be follow the actions of the most recent attribute decision by the primary user (e.g., if the spending limit was $300 and the user spent $195, and then the spending limit was changed to $200, the user would not be able to make an additional $10 charge because it would be over the new spending limit of $200). The primary user may be able to set attributes, using user device 402, that do not go into effect for a certain amount of time (e.g., gas allowance starting two weeks from today) or are only in effect for a certain amount of time (e.g., temporary elevated total limit for the next week while parents are on vacation).

Figure 2:
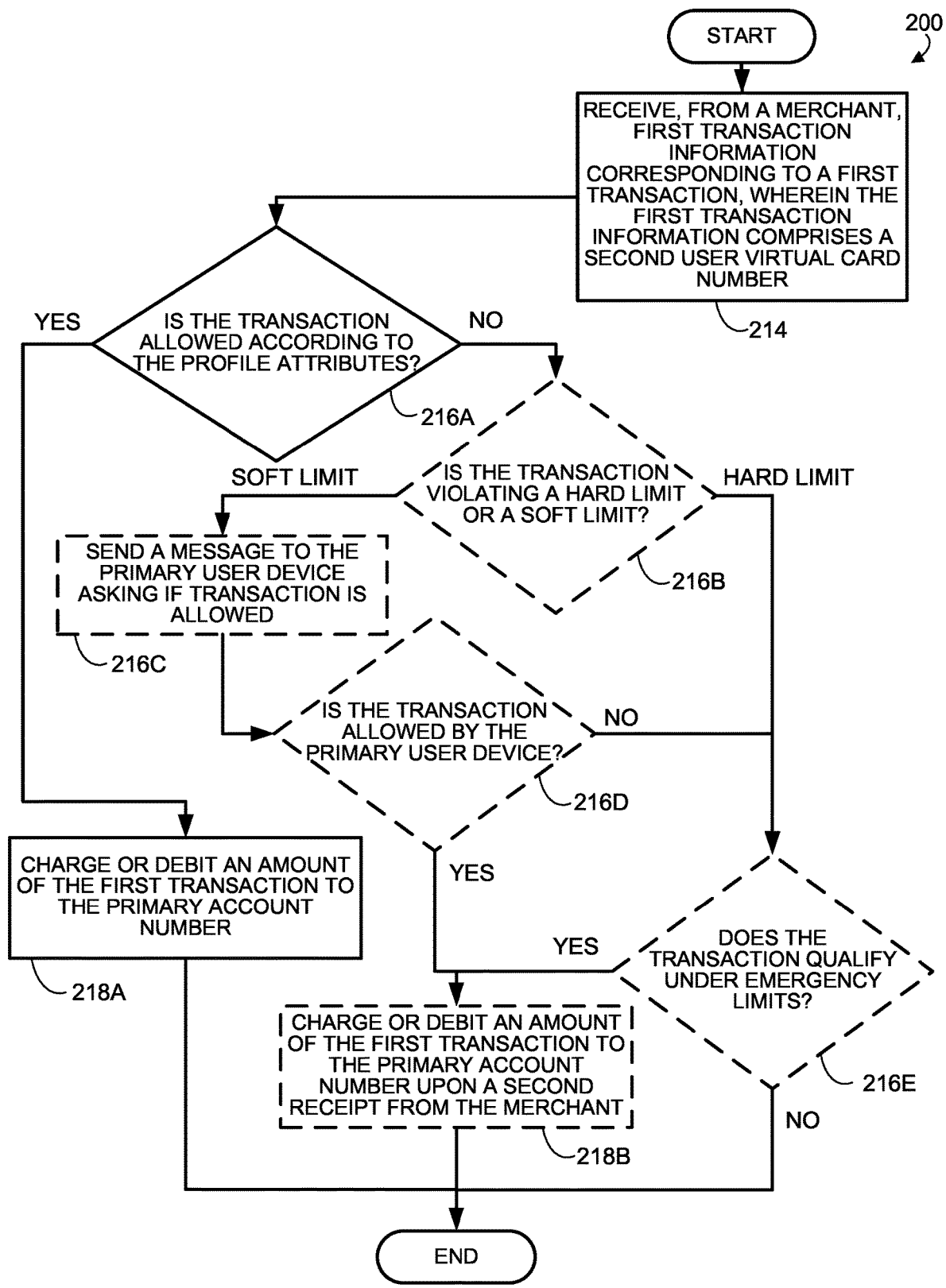
FIG. 2 is a flow diagram illustrating an exemplary method for accounts with multiple profiles in accordance with certain embodiments of the disclosed technology.

FIG. 2 is a flow diagram illustrating an exemplary method 200 for accounts with multiple profiles, in accordance with certain embodiments of the disclosed technology. The steps of method 200 may be performed by one or more components of the system 400 (e.g., user profile system 320 or web server 410 of processing system 408 or user device 402), as described in more detail with respect to FIGS. 3 and 4.

Method 200 of FIG. 2 is similar to method 100 of FIG. 1. The descriptions of blocks 214 and 218A in method 200 are similar to the respective descriptions of blocks 114 and 118 of method 100 and are not repeated herein for brevity.

In block 216A, the user profile system 320 may decide if the transaction is allowed according to the attributes assigned to that profile. The user profile system 320 will analyze the transaction data using information provided by the merchant. If the transaction data is within the attributes assigned to that user profile (e.g., user profile 3 is attempting to make a $300 charge when the limit is $500), then the transaction will be allowed (in block 218A). If the transaction data is not within the attributes assigned to that use profile, then more decisions are necessary (path to block 216B).

In optional block 216B, the user profile system 320 may decide if the transaction is violating a hard limit or a soft limit. Hard limits may prevent the second user from completing a transaction because of a limitation. Attempts by the second user to break the hard limit may cause an optional notification to be sent to the primary user device 402 (e.g., If the second user is blocked from making transactions at restaurants and attempts to charge the card at a restaurant, then the transaction would be declined, and the primary user may be notified via the primary user device 402 that the second user attempted to make a transaction at a restaurant. This may include details of which restaurant).

In optional block 216C, the user profile system 320 may send a message to the primary user device 402 to ask the primary user if the transaction is allowed for the secondary user). Soft limits may allow the primary user to give permission for the second user, via the primary user device 402, which would send a send a signal back to user profile system 320, to complete a transaction even though it would otherwise break a limitation rule (attribute). For example, when a second user is blocked from making transactions from gas stations after 10 PM and attempts to charge the card at a gas station, the transaction would be declined, and the primary user would be notified, via the primary user device 402, that a transaction was attempted at a particular gas station on the primary user device 402. The notification may additionally include a prompt for the primary user to respond to the transaction on the primary user device 402. The notification may come from the application associated with the financial card or the notification may be a chat or text message (e.g., "respond YES to allow").

In optional block 216D, the user profile system 320 may decide if the transaction was allowed by the primary user. The primary user may allow the transaction for the second user using the primary user device 402, which would transmit the allowance to the user profile system 320, (in which case, the second user would just have to attempt the transaction again within a predetermined time period) and the transaction would be accepted. The primary user may reject the transaction, which would turn the soft limit temporarily into a hard limit for a predetermined time. If the primary user does not respond via the primary user device 402 in a predetermined time period, it may be considered a rejection by card user profile 320 after a predetermined amount of time.

Additionally, the secondary user may also receive a notification from the application associated with their user profile when completing a transaction that would be outside the limitations assigned by the attribute. This notification may include a prompt allowing the secondary user to ask the main user for permission to make a transaction if the attribute limitation preventing the transaction is a soft limit.

In optional block 216E, the user profile system 320 may decide if the transaction qualifies for acceptance under emergency limits. Certain attributes may also be eligible for emergency limits to be set by the primary user using the primary user device 402. For example, a child may need to purchase something outside typical limits for emergency reasons (e.g., gas to get home). The secondary user application may have a method (e.g., a menu or button) by which the secondary user, in very limited circumstances, as selected by the primary user, using primary user device 402, may be able temporarily override certain selected hard and soft limits using the second user device 404. Such limits may apply only in emergencies where the primary user is unreachable or in circumstances that the primary user selects (e.g., the primary user is greater than 50 miles away from the secondary user). The secondary user may have to make a selection on their secondary user application, on second user device 404, which may relay a signal to user profile system 320, before attempting to use the card for the transaction to be charged or debited. Emergency limits may be subject to time and frequency constraints (e.g., the secondary user can only make a purchase that would fall under emergency limits once per month).

In optional block 218B, the user profile system 320 may, upon a second attempt of the merchant receiving the secondary card information, charge or debit the transaction amount to the primary account. This may involve the merchant running the card again after authorization has been received from the primary user device 402 at user profile system 320. User profile system 320 would recognize the second attempt of the transaction and, upon the approval of the primary user, allow the transaction to proceed as otherwise described in the description for block 118.

Figure 3:
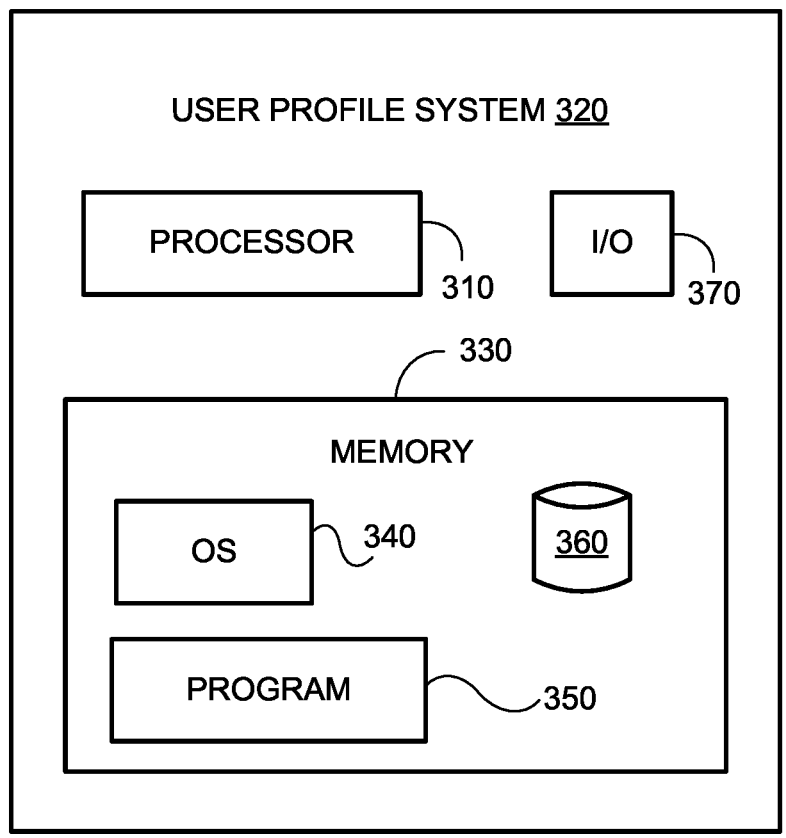
FIG. 3 is block diagram of an example user profile system used to provide accounts with multiple profiles, according to an example implementation of the disclosed technology.
Figure 4:
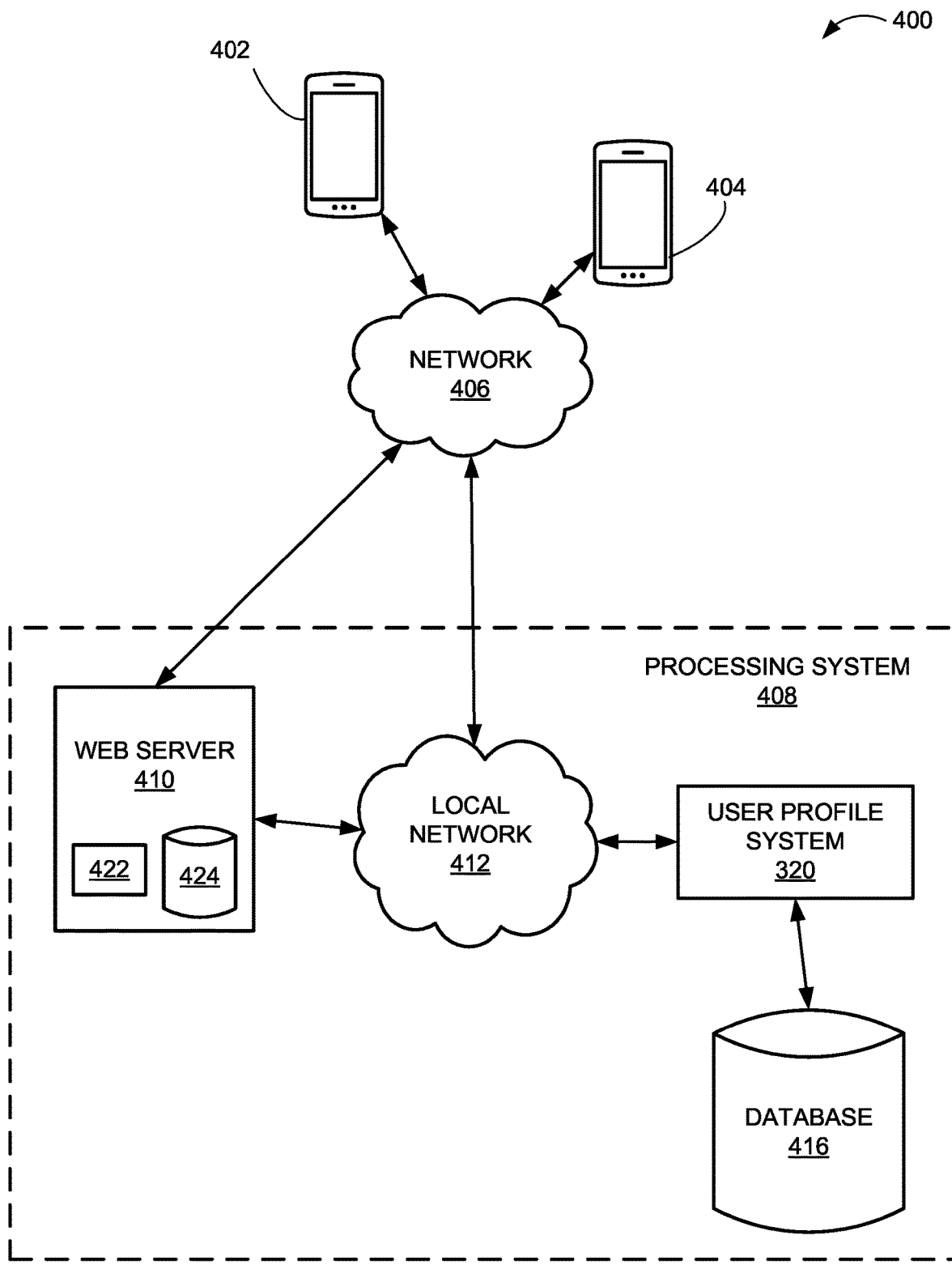
FIG. 4 is block diagram of an example system that may be used to provide accounts with multiple profiles, according to an example implementation of the disclosed technology.

FIG. 3 is a block diagram of an example user profile system 320 used to create and use multiple profiles according to an example implementation of the disclosed technology. According to some embodiments, the user device 402 and web server 410, as depicted in FIG. 4 and described below, may have a similar structure and components that are similar to those described with respect to user profile system 320 shown in FIG. 3. As shown, the user profile system 320 may include a processor 310, an input/output (I/O) device 370, a memory 330 containing an operating system (OS) 340 and a program 350. In certain example implementations, the user profile system 320 may be a single server or may be configured as a distributed computer system including multiple servers or computers that interoperate to perform one or more of the processes and functionalities associated with the disclosed embodiments. In some embodiments user profile system 320 may be one or more servers from a serverless or scaling server system. In some embodiments, the user profile system 320 may further include a peripheral interface, a transceiver, a mobile network interface in communication with the processor 310, a bus configured to facilitate communication between the various components of the user profile system 320, and a power source configured to power one or more components of the user profile system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the user profile system 320 may include one or more storage devices configured to store information used by the processor 310 (or other components) to perform certain functions related to the disclosed embodiments. In one example, the user profile system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The user profile system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the user profile system 320 may include the memory 330 that may include one or more programs 350 to perform one or more functions of the disclosed embodiments. For example, in some embodiments, the user profile system 320 may additionally manage dialogue and/or other interactions with the customer via a program 350.

The processor 310 may execute one or more programs 350 located remotely from the user profile system 320. For example, the user profile system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a user profile system database 360 for storing related data to enable the user profile system 320 to perform one or more of the processes and functionalities associated with the disclosed embodiments.

The user profile system database 360 may include stored data relating to status data (e.g., average session duration data, location data, idle time between sessions, and/or average idle time between sessions) and historical status data. According to some embodiments, the functions provided by the user profile system database 360 may also be provided by a database that is external to the user profile system 320, such as the database 416 as shown in FIG. 4.

The user profile system 320 may also be communicatively connected to one or more memory devices (e.g., databases) locally or through a network. The remote memory devices may be configured to store information and may be accessed and/or managed by the user profile system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The user profile system 320 may also include one or more I/O devices 370 that may comprise one or more interfaces for receiving signals or input from devices and providing signals or output to one or more devices that allow data to be received and/or transmitted by the user profile system 320. For example, the user profile system 320 may include interface components, which may provide interfaces to one or more input devices, such as one or more keyboards, mouse devices, touch screens, track pads, trackballs, scroll wheels, digital cameras, microphones, sensors, and the like, that enable the user profile system 320 to receive data from a user (such as, for example, via the user device 402).

In examples of the disclosed technology, the user profile system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the user profile system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the user profile system 320 may include a greater or lesser number of components than those illustrated.

FIG. 4 is a block diagram of an example system that may be used to view and interact with processing system 408, according to an example implementation of the disclosed technology. The components and arrangements shown in FIG. 4 are not intended to limit the disclosed embodiments as the components used to implement the disclosed processes and features may vary. As shown, processing system 408 may interact with a user device 402 via a network 406.

In certain example implementations, the processing system 408 may include a local network 412, a user profile system 320, a web server 410, and a database 416.

In some embodiments, a user may operate the user device 402. User device 402 may be primary user device 402 used by a primary user. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the processing system 408. In some embodiments, the user device 402 may include or incorporate electronic communication devices for hearing or vision impaired users. A second user may use a second user device 404. The second user device 404 may be largely similar to, or have the same features, hardware, or software as, the primary user device 402. There may be a number of second user devices 404 used with the system (e.g., a third user device associated with a third user).

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the processing system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Financial services may be a system associated with a financial service provider, which may be an entity providing financial services. For example, financial services may be associated with a bank, a credit card issuer, or other type of financial service entity that generates, provides, manages, and/or maintains financial service accounts. Financial services may store information about accounts and include, for example, credit card accounts, loan accounts, checking accounts, savings accounts, reward accounts, loyalty program accounts, debit card accounts, cryptocurrency accounts, and/or other types of financial service accounts known to those skilled in the art. Financial services may include infrastructure and components that are configured to generate and/or provide financial service accounts such as credit card accounts, checking accounts, debit card accounts, loyalty or reward programs, lines of credit, and the like. Financial services may authorize or decline credit card authorization requests and may issue authorization codes.

Merchants may include one or more entities that provide goods, services, and/or information, such as a retailer (e.g., Macy's®, Target®, etc.), a grocery store, an entertainment venue (e.g., cinema, theater, museum, etc.), a service provider (e.g.; utility company, etc.), a restaurant, a bar; a non-profit organization (e.g., ACLU™. AARP®, etc.) or other type of entity that provides goods, services, and/or information that consumers (e.g., end-users or other business entities) may purchase, consume, use, etc. Merchants are not limited to entities associated with any particular business, specific industry, or distinct field.

Merchants may include one or more computing systems, such as servers, that are configured to execute stored software instructions to perform operations associated with a merchant, including one or more processes associated with processing purchase transactions, generating transaction data, generating product data (e.g., stock keeping unit (SKU) data) relating to purchase transactions, etc.

In some embodiments, merchants may be brick-and-mortar locations that a consumer may physically visit and purchase goods and services. Such physical locations may include a merchant paying system, which may include computing devices that perform financial service transactions with consumers (e.g., Point-of-Sale (POS) terminal(s), kiosks, etc.). The merchant paying system may include one or more computing devices configured to perform operations consistent with facilitating purchases at merchants. The merchant paying system may also include back- and/or front-end computing components that store data and execute software instructions to perform operations consistent with disclosed embodiments, such as computers that are operated by employees of the merchant (e.g., back office systems, etc.).

For each purchase, the merchant paying system may collect and/or maintain data identifying the financial card that has been used to make the purchases at merchants. Additionally, the merchant paying system may collect and/or maintain data identifying a customer associated with the financial card and/or data identifying a date on which the purchase was made. The merchant paying system may collect and/or maintain other data as well. Data collected and/or maintained by merchant paying system may be provided to databases 360.

In some embodiments, a payment processor may be used. The payment processor be a device configured to collect credit card information and issue credit card authorizations. Payment processor may be a magnetic stripe reader that collects credit card information and connects with a credit card network. In such embodiments, the payment processor may include software to append information to the credit card authorization or issue new notifications that facilitate hours-of-operation modeling. For example, the payment processor may include a program to flag a credit card authorization, append a time stamp based on a location code (e.g. Zip code T), and specify the merchant's address.

In some embodiments, to simplify the collection of data, the payment processor may also be connected to databases 360. In such embodiments, the payment processor may include a communication device that sends information to both financial services (e.g., acquirer bank) and databases 360. In such embodiments, when the payment processor is used to complete a credit card transaction, the payment processor may issue a simplified authorization with only time, date, and location. The simplified authorization may then be transmitted to databases 360 and be later used by a prediction system or a model generator. The simplified authorization improves transmission rates and facilitates selection of authorizations for modeling hours of operation. For instance, simplified credit card authorization records may be easier to filter and sort. In yet other embodiments, the payment processor may add information to the credit card authorization for the prediction model. For example, the payment processor may append local time and merchant ID to the authorization before sending it to databases 360 and/or financial services.

Data associated with merchants may include, for example, historical data identifying authorizations associated with financial cards used to make purchases at merchants. A financial card may represent any manner of making a purchase at merchants. A financial card may be, for example, a financial services product associated with a financial service account, such as a bank card, key fob, or smartcard. For example, a financial card may comprise a credit card, debit card, loyalty card, or other similar financial services product. In some embodiments, a financial card may comprise a digital wallet or payment application. Thus, a financial card is not limited to a specific physical configuration and may be provided in any form capable of performing the functionality of the disclosed embodiments. In some embodiments, a financial card may include or be included in a mobile device; a wearable item, including jewelry, a smart watch, or any other device suitable for carrying or wearing on a customer's person. Other financial cards are possible as well. Data identifying financial cards used to make purchases at merchants may include, for example, dates on which the purchases were made at merchants and identification of customers associated with the financial cards.

The user profile system 320 may include programs (scripts, functions, algorithms) to configure data for visualizations and provide visualizations of datasets and data models on the user device 402. This may include programs to generate graphs and display graphs. The user profile system 320 may include programs to generate histograms, scatter plots, time series, or the like on the user device 402. The user profile system 320 may also be configured to display properties of data models and data model training results including, for example, architecture, loss functions, cross entropy, activation function values, embedding layer structure and/or outputs, convolution results, node outputs, or the like on the user device 402.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The processing system 408 may be associated with and optionally controlled by one or more entities such as a business, corporation, individual, partnership, or any other entity that provides one or more of goods, services, and consultations to individuals such as customers. In some embodiments, the processing system 408 may be controlled by a third party on behalf of another business, corporation, individual, partnership. The processing system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the user profile system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the processing system 408 to interact with one another and to connect to the network 406 for interacting with components in the system 400 environment. In some embodiments, the local network 412 may include an interface for communicating with or linking to the network 406. In other embodiments, certain components of the processing system 408 may communicate via the network 406, without a separate local network 406.

The processing system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access processing system 408 using the cloud computing environment. User device 402 may be able to access processing system 408 using specialized software. The cloud computing environment may eliminate the need to install specialized software on user device 402.

In accordance with certain example implementations of the disclosed technology, the processing system 408 may include one or more computer systems configured to compile data from a plurality of sources the user profile system 320, web server 410, and/or the database 416. The user profile system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Although the preceding description describes various functions of a web server 410, a user profile system 320, a database 416, a call center server 430, and agent device 440 in some embodiments, some or all of these functions may be carried out by a single computing device.

Example Use Case

The following example use cases describe examples of a typical user flow pattern. This section is intended solely for explanatory purposes and not in limitation.

In the following examples, a primary user, using user device 402, configures his credit card account to have separate user profiles for his daughter and his son (block 102). The primary user selects an option on his user device 402 (e.g., smart phone) to create a second user profile for his daughter (block 104). The primary user also selects an option on his user device 402 to create a third user profile for his son. The user profile system 320 creates a second user profile named "Lucy" for the primary user's daughter (block 106) and a third user profile named "Jack" for the primary user's son. The user profile system 320 generates a GUI with initial balances of $0 for both the second (block 108) and third user profiles. The user profile system 320 sends the GUI for the second user profile to the user device 402 and the user device 402 displays a prompt to assign attributes to the second user profile (block 110). The user profile system 320 sends the GUI for the third user profile to the user device 402 and the user device 402 displays a prompt to assign attributes to the third user profile (block 110). The primary user selects, using user device 402, that his daughter, the second user, should be able to make entertainment, food, clothing, and gas purchases under $100 on his smartphone, with the overall budget as a soft limit, and the categories of purchases as hard limits. This information is sent by user device 402 to user profile system 320 (block 112). The primary user also selects, using user device 402, for his son, the third user, to have preset attributes for a child, which include food and toy purchases under $50 with the overall budget as a soft limit, and the categories of purchases as hard limits. This information is also sent by user device 402 to user profile system 320 (block 112). The primary user distributes the respective VCNs and VCN tokens to his daughter and son using his smartphone, user device 402. Lucy, the second user, goes shopping with friends and makes a clothing purchase for $60. The clothing merchants receives the second user virtual card number information from Lucy's phone, second user device 404. The user profile system 320 receives transaction information from the merchant containing the second user VCN (block 114). The user profile system 320 then determines that the transaction is allowed because the charge is for clothing and under $100 (block 116). Therefore, the user profile system 320 charges the amount of the first transaction to the PAN (block 118). The user profile system 320 then associates the first transaction information with the second user profile (block 120) and adds the first transaction to the balance of the second user profile while generating a GUI showing a balance of $60 and the transaction data (block 122). The user profile system 320 then sends the GUI to display on the primary user device 402 (block 124).

The primary user, in response to seeing the purchase for $60, lowers the spending limit for the second user profile to $75, with purchases for only food and gas allowed using user device 402. User device 402 sends this information to user profile system 320. Lucy, the second user, then attempts to make a purchase for $20 of gas, which is received from the merchant by user profile system 320 (block 114). The user profile system 320 determines that the transaction is not allowed because of the overall spend limit of $75, and a purchase of $20 would be over the limit (see block 216A). Therefore, the user profile system 320 does not charge the transaction, but, because the spend limit is setup as a soft limit (see block 216B), an alert of Lucy's transaction for gas is sent to the primary user's device 402 (see block 216C). The primary user allows the transaction (see block 216D) using the primary user device 402. Lucy, the second user, is then allowed to make a purchase within a short time after the original attempt (see block 218B). The second transaction information is received by user profile system 320 (block 114) and is allowed because it is within the soft limit attributes (block 116), and is charged to the PAN (block 118). The second transaction is then associated with the second user profile account (block 120) and the system generates and sends a second GUI with the additional balance and transaction data to the primary user's smartphone (blocks 122 and 124).

Jack, the third user, goes on a school field trip and buys lunch for $15. The food merchant receives the third user virtual card number information from Jack's phone, an additional third user device (which is similar to the second user device 404). The user profile system 320 receives third transaction information from the merchant containing the third user VCN (block 114). The user profile system 320 then determines that the transaction is allowed because the charge is for food and under $50 (block 116). Therefore, the user profile system 320 charges the amount of the third transaction to the PAN (block 118). The user profile system 320 then associates the third transaction information with the third user profile (block 120) and adds the third transaction to the balance of the third user profile while generating a GUI (block 122). The user profile system 320 then sends the GUI with a balance of $15 and transaction information to display on the primary user device 402 (block 124).

After the trip to the museum, Jack goes to a movie with his friends. Jack attempts to charge $20 for the movie using the third VCN token on his phone, a third user device. The movie theater merchant receives the third user virtual card number information from Jack's phone. The user profile system 320 receives fourth transaction information from the merchant containing the third user VCN (block 114). The user profile system 320 then determines that the transaction is not allowed because the charge is for entertainment, which is a hard limit (block 116, see also block 216B). The primary user is not given an option to allow the transaction in this case.

In some examples, disclosed systems or methods may involve one or more of the following clauses:

Clause 1: A system for using a card with multiple user profiles comprising: one or more processors; and memory in communication with the one or more processors and storing instructions that, when executed by the one or more processors, are configured to cause the system to: configure the card with a primary account number such that a primary user can control one or more profiles of one or more secondary users associated with one or more virtual card numbers; receive, from a primary user device, first directions to create a second user profile for a second user; generate the second user profile, the second user profile associated with a second user virtual card number and a second user virtual card number token; generate a first graphical user interface (GUI) reflecting an initial balance associated with the second user profile; send the first GUI and a first prompt for one or more attributes for the second user profile for display on the primary user device; receive, from the primary user device, the one or more attributes for the second user profile; receive, from a merchant, first transaction information corresponding to a first transaction, wherein the first transaction information comprises the second user virtual card number; determine whether the first transaction is allowed according to the attributes assigned to the second user profile; responsive to determining that the first transaction is allowed according to the attributes assigned to the second user profile: charge or debit an amount of the first transaction to the primary account number; associate the first transaction information with the second user profile based on the first transaction information comprising the second user virtual card number; generate a second GUI reflecting an updated balance associated with the second user profile and the first transaction information; and send the second GUI to display on the primary user device.

Clause 2: The system of clause 1, wherein the one or more attributes further comprises one or more time limits, spending limits, categorical limits, merchant limits, or combinations thereof.

Clause 3: The system of clause 1, wherein the second user profile further comprises a name of the second user, wherein the name of the second user can be used to charge the card in association with the second user virtual card number.

Clause 4: The system of clause 1, further comprising distributing, to a digital wallet of the second user, the second user virtual card number token.

Clause 5: The system of clause 1, wherein the one or more attributes are one or more hard limits or one or more soft limits, wherein hard limits prevent charging or debiting the amount of the first transaction to the primary account number.

Clause 6: The system of clause 5, further comprising: determining whether the one or more attributes is the one or more soft limits; responsive to determining that the one or more attributes is the soft limit: transmitting, to the primary user device, a second prompt to authorize the first transaction; and receiving, from the primary user device, second directions that the first transaction is allowed.

Clause 7: The system of clause 6, wherein when the second directions are not received within a time threshold, the first transaction is declined.

Clause 8: The system of clause 6, further comprising: receiving, from the primary user device, the second directions that the first transaction is not allowed; and declining the first transaction.

Clause 9: The system of clause 1, further comprising: receiving, from the primary user device, third directions to change one or more attributes of the second user profile; receiving, from the primary user device, one or more changed attributes to the second user profile; and updating the second user profile based on the one or more changed attributes.

Clause 10: The system of clause 1, further comprising updating a third GUI of a second user device to reflect the updated balance associated with the second user profile.

Clause 11: A system for using a card with multiple user profiles comprising: one or more processors; and memory in communication with the one or more processors and storing instructions that, when executed by the one or more processors, are configured to cause the system to: receive, from a merchant, first transaction information corresponding to a first transaction, wherein the first transaction information comprises a second user virtual card number for a second user; determine whether the first transaction is allowed according to one or more second profile attributes assigned to a second user profile; and responsive to determining that the first transaction is allowed according to the second profile attributes assigned to the second user profile: charge or debit an amount of the first transaction to a primary account number.

Clause 12: The system of clause 11, further comprising: generating a first GUI reflecting a first initial balance associated with the second user profile; sending the first GUI to display on a primary user device; associating the first transaction information with the second user profile based on the first transaction information comprising the second user virtual card number; generating a second GUI reflecting a first updated balance associated with the second user profile and the first transaction information; and sending the second GUI to display on the primary user device.

Clause 13: The system of clause 12, further comprising: receiving, from the merchant, second transaction information corresponding to a second transaction, wherein the second transaction information comprises a third user virtual card number for a third user; determining whether the second transaction is allowed according to one or more third profile attributes assigned to a third user profile; and responsive to determining that the second transaction is allowed according to the third profile attributes assigned to the third user profile: charging or debiting the second transaction to the primary account number.

Clause 14: The system of clause 13, further comprising: generating a third GUI reflecting a second initial balance associated with the third user profile; sending the third GUI to display on the primary user device; associating the second transaction information with the third user profile based on the second transaction information comprising the third user virtual card number; generating a fourth GUI reflecting a second updated balance associated with the third user profile and the second transaction information; and sending the fourth GUI to display on the primary user device.

Clause 15: The system of clause 13, further comprising: receiving, from the primary user device, directions to change one or more third user profile attributes; receiving, from the primary user device, one or more changed third user profile attributes; and updating the third user profile based on the one or more changed attributes.

Clause 16: The system of clause 15, further comprising: receiving, from the merchant, third transaction information corresponding to a third transaction, wherein the third transaction information comprises the third user virtual card number; and determining that the third transaction is not allowed according to the one or more changed attributes assigned to the third user profile.

Clause 17: A system for using a card with multiple user profiles comprising: one or more processors; and memory in communication with the one or more processors and storing instructions that, when executed by the one or more processors, are configured to cause the system to: configure the card with a primary account number such that a primary user can control one or more profiles of one or more secondary users associated with one or more virtual card numbers; receive, from a primary user device, first directions to create a second user profile for a second user; generate the second user profile, the second user profile associated with a second user virtual card number and a second user virtual card number token; receive, from the primary user device, one or more attributes for the second user profile; receive, from a merchant, first transaction information corresponding to a first transaction, wherein the first transaction information comprises the second user virtual card number; determine whether the first transaction is allowed according to the attributes assigned to the second user profile; and responsive to determining that the first transaction is allowed according to the attributes assigned to the second user profile: charge or debit an amount of the first transaction to the primary account number.

Clause 18: The system of clause 17, further comprising: receiving, from the primary user device, second directions to change the one or more attributes of the second user profile; receiving, from the primary user device, one or more changed attributes to the second user profile; and updating the second user profile based on the one or more changed attributes.

Clause 19: The system of clause 18, further comprising: receiving, from the merchant, second transaction information corresponding to a second transaction, wherein the second transaction information comprises the second user virtual card number; and determining that the second transaction is not allowed according to the changed attributes assigned to the second user profile.

Clause 20: The system of clause 18, further comprising: generating a first GUI reflecting the one or more attributes associated with the second user profile; sending the first GUI to display on the primary user device; generating a second GUI reflecting the one or more changed attributes associated with the second user profile; and sending the second GUI to display on the primary user device.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for using a card with multiple user profiles comprising:
   one or more processors; and
   memory in communication with the one or more processors and storing instructions that, when executed by the one or more processors, are configured to cause the system to:
      configure the card with a primary account number such that a primary user can control one or more profiles of one or more secondary users associated with one or more virtual card numbers;
      receive, from a primary user device, first directions to create a second user profile for a second user;
      generate the second user profile, the second user profile associated with a second user virtual card number and a second user virtual card number token;
      generate a first graphical user interface (GUI) reflecting an initial balance associated with the second user profile;
      send the first GUI and a first prompt for one or more attributes for the second user profile for display on the primary user device;
      receive, from the primary user device, the one or more attributes for the second user profile;
      receive, from a merchant, first transaction information corresponding to a first transaction comprising the second user virtual card number;
      determine whether the first transaction is allowed according to the attributes assigned to the second user profile; and
      responsive to determining that the first transaction is allowed according to the attributes assigned to the second user profile:
         charge or debit an amount of the first transaction to the primary account number;
         associate the first transaction information with the second user profile based on the first transaction information comprising the second user virtual card number;
         generate a second GUI reflecting an updated balance associated with the second user profile and the first transaction information; and
         send the second GUI to display on the primary user device.

2. The system of claim 1, wherein the one or more attributes further comprises one or more time limits, spending limits, categorical limits, merchant limits, or combinations thereof.

3. The system of claim 1, wherein the second user profile further comprises a name of the second user, wherein the name of the second user can be used to charge the card in association with the second user virtual card number.

4. The system of claim 1, wherein the memory further stores instructions that, when executed by the one or more processors, are further configured to cause the system to distribute, to a digital wallet of the second user, the second user virtual card number token.

5. The system of claim 1, wherein the one or more attributes are one or more hard limits or one or more soft limits, wherein hard limits prevent charging or debiting the amount of the first transaction to the primary account number.

6. The system of claim 5, wherein the memory further stores instructions that, when executed by the one or more processors, are further configured to cause the system to:
   determine whether the one or more attributes is the one or more soft limits;
   responsive to determining that the one or more attributes is the soft limit:
      transmit, to the primary user device, a second prompt to authorize the first transaction; and
      receive, from the primary user device, second directions that the first transaction is allowed.

7. The system of claim 6, wherein when the second directions are not received within a time threshold, the first transaction is declined.

8. The system of claim 6, wherein the second prompt is received from a second user device associated with the second user profile, the second prompt comprising a request for the primary user to approve the first transaction.

9. The system of claim 5, wherein the memory further stores instructions that, when executed by the one or more processors, are further configured to cause the system to:
   determine whether the one or more attributes is the one or more soft limits;
   responsive to determining that the one or more attributes is the soft limit:
      transmit, to the primary user device, a second prompt to authorize the first transaction;
      receive, from the primary user device, second directions that the first transaction is not allowed; and
      decline the first transaction.

10. The system of claim 1, wherein the memory further stores instructions that, when executed by the one or more processors, are further configured to cause the system to:
- receive, from the primary user device, third directions to change one or more attributes of the second user profile;
- receive, from the primary user device, one or more changed attributes to the second user profile; and
- update the second user profile based on the one or more changed attributes.

11. The system of claim 1, wherein the memory further stores instructions that, when executed by the one or more processors, are further configured to cause the system to update a third GUI of a second user device to reflect the updated balance associated with the second user profile.

12. A system for using a card with multiple user profiles comprising:
- one or more processors; and
- memory in communication with the one or more processors and storing instructions that, when executed by the one or more processors, are configured to cause the system to:
  - configure the card with a primary account number such that a primary user can control one or more profiles of one or more secondary users associated with one or more virtual card numbers;
  - receive, from a primary user device, first directions to create a second user profile for a second user;
  - generate the second user profile, the second user profile associated with a second user virtual card number and a second user virtual card number token;
  - generate a first graphical user interface (GUI) reflecting an initial balance associated with the second user profile;
  - send the first GUI and a first prompt for one or more attributes for the second user profile for display on the primary user device;
  - receive, from the primary user device, the one or more attributes for the second user profile;
  - receive, from a merchant, first transaction information corresponding to a first transaction comprising the second user virtual card number;
  - determine whether the first transaction is allowed according to the attributes assigned to the second user profile;
  - responsive to determining that the first transaction is allowed according to the attributes assigned to the second user profile:
    - charge or debit an amount of the first transaction to the primary account number;
    - associate the first transaction information with the second user profile based on the first transaction information comprising the second user virtual card number;
    - generate a second GUI reflecting an updated balance associated with the second user profile and the first transaction information; and
    - send the second GUI to display on the primary user device; and
  - responsive to determining that the first transaction is not allowed according to the attributes assigned to the second user profile:
    - receive, from a second user device associated with the second user profile, a request to accept the first transaction under emergency attribute limits;
    - determine that the first transaction qualifies for acceptance under emergency attribute limits; and
    - charge or debit the amount of the first transaction to the primary account number.

13. The system of claim 12, wherein the receiving of the request occurs prior to attempting to use the card for the first transaction.

14. A non-transitory computer-readable medium storing instructions that, when executed by one or more processors, cause a computing device to:
- configure the card with a primary account number such that a primary user can control one or more profiles of one or more secondary users associated with one or more virtual card numbers;
- receive, from a primary user device, first directions to create a second user profile for a second user;
- generate the second user profile, the second user profile associated with a second user virtual card number;
- generate a first graphical user interface (GUI) reflecting an initial balance associated with the second user profile;
- send the first GUI and a first prompt for one or more attributes for the second user profile for display on the primary user device;
- receive, from the primary user device, the one or more attributes for the second user profile;
- receive, from a merchant, first transaction information corresponding to a first transaction comprising the second user virtual card number;
- determine whether the first transaction is allowed according to the attributes assigned to the second user profile;
- responsive to determining that the first transaction is allowed according to the attributes assigned to the second user profile:
  - charge or debit an amount of the first transaction to the primary account number;
  - associate the first transaction information with the second user profile based on the first transaction information comprising the second user virtual card number;
  - generate a second GUI reflecting an updated balance associated with the second user profile and the first transaction information; and
  - send the second GUI to display on the primary user device.

15. The non-transitory computer-readable medium of claim 14, wherein the one or more attributes are one or more hard limits or one or more soft limits, wherein hard limits prevent charging or debiting the amount of the first transaction to the primary account number.

16. The non-transitory computer-readable medium of claim 15, wherein the non-transitory computer-readable medium further stores instructions that, when executed by the one or more processors, further cause the computing device to:
- determine whether the one or more attributes is the one or more soft limits;
- responsive to determining that the one or more attributes is the soft limit:
  - transmit, to the primary user device, a second prompt to authorize the first transaction; and
  - receive, from the primary user device, second directions that the first transaction is allowed.

17. The non-transitory computer-readable medium of claim 15, wherein the non-transitory computer-readable medium further stores instructions that, when executed by the one or more processors, further cause the computing device to:

determine whether the one or more attributes is the one or more soft limits;

responsive to determining that the one or more attributes is the soft limit:
- transmit, to the primary user device, a second prompt to authorize the first transaction;
- receive, from the primary user device, second directions that the first transaction is not allowed; and
- decline the first transaction.

18. The non-transitory computer-readable medium of claim 16, wherein the second prompt is received from a second user device associated with the second user profile, the second prompt comprising a request for the primary user to approve the first transaction.

19. The non-transitory computer-readable medium of claim 14, wherein the non-transitory computer-readable medium further stores instructions that, when executed by the one or more processors, further cause the computing device to:

responsive to determining that the first transaction is not allowed according to the attributes assigned to the second user profile:
- receive, from a second user device associated with the second user profile, a request to accept the first transaction under emergency attribute limits;
- determine that the first transaction qualifies for acceptance under emergency attribute limits; and
- charge or debit the amount of the first transaction to the primary account number.

20. The non-transitory computer-readable medium of claim 19, wherein the receiving of the request occurs prior to attempting to use the card for the first transaction.

* * * * *